Figure 1:
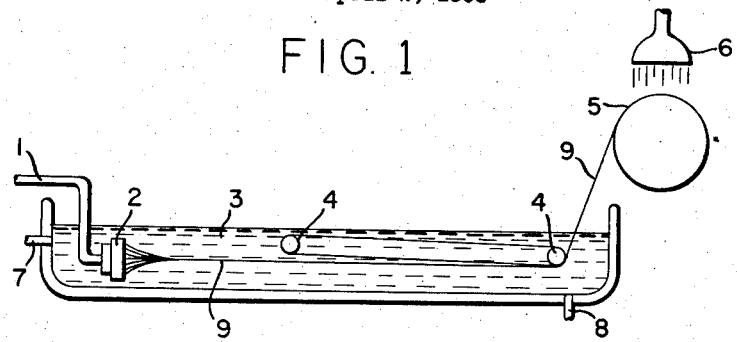

Dec. 20, 1960  R. N. BLOMBERG  2,965,437
PROCESS FOR WET SPINNING PLASTICIZED ELASTOMERIC
POLYMERS AND SUBSEQUENTLY REMOVING
THE PLASTICIZER
Filed April 2, 1958

INVENTOR
RICHARD N. BLOMBERG
BY Frank C. Hilberg
ATTORNEY

United States Patent Office 2,965,437
Patented Dec. 20, 1960

2,965,437

PROCESS FOR WET SPINNING PLASTICIZED ELASTOMERIC POLYMERS AND SUBSEQUENTLY REMOVING THE PLASTICIZER

Richard N. Blomberg, Spring Valley, Del., assignor to E. I. du Pont de Nemours and Company, Wilmington, Del., a corporation of Delaware Filed Apr. 2, 1958, Ser. No. 725,866

11 Claims. (Cl. 18—54)

This invention relates to a wet method for preparing shaped articles from synthetic polymers. It relates especially to the wet spinning of fibers from solutions of substantially linear, segmented elastic polymers.

In the wet spinning process for forming fibers, a polymer solution is extruded through an orifice into a setting bath. This setting or coagulating bath generally contains a proportion of the polymer solvent and a proportion of a liquid which is miscible with the solvent. The fiber is formed as the solvent diffuses out into the bath. This diffusion process, in which the solvent leaves the nascent fiber, is in general accompanied by an inverse process, namely the penetration of the bath liquid into the fiber.

The fiber produced by these processes is usually weak and has a chalky appearance because of its open structure. Therefore it must be subjected to further treatment in order to heal the voids of the open structure and raise fiber properties to an acceptable level.

Elastomers having excellent properties may be derived from polyisocyanate-modified polyesters and polyethers. For example, in a copending application Ser. No. 556,071 of Frankenburg and Frazer there is disclosed a new class of synthetic elastomeric copolymers having recurring

groups, attached through

groups to a divalent organic radical having a molecular weight greater than 700, in which X is selected from the group consisting of hydrogen and monovalent organic radicals. These elastomeric copolymers have excellent elastic properties, toughness, abrasion resistance, and improved heat stability, oxidative stability, and stability on exposure to ultraviolet light.

Fibers having these excellent characteristics have been prepared by dry spinning. But fibers prepared by wet spinning have not shown the same high tenacity and elastic properties. They exhibit the chalky appearance already referred to, which is related to the presence of a large number of void spaces in the fibers. These voids arise from excessively rapid coagulation of the polymer solution in the setting bath. They are also formed when water from the setting bath permeates the nascent fiber and reacts with residual isocyanate groups to form carbon dioxide.

A wet spinning method the product of which would have properties comparable with those of the dry spun product would be highly desirable, since wet spinning has such well-known advantages as suitability for preparing high deniers, high productivity per position, low operating temperatures, and large spinning orifices, which minimize plugging difficulties and lengthen filter life.

Accordingly it is an object of this invention to provide a wet spinning process for preparing elastomer fibers which have the same high properties as those obtainable by dry spinning. Another object is to provide such a process that does not require a healing step. It is also an object of the invention to provide substantially non-porous and bubble-free elastic fibers with improved and uniform physical properties. Other objects will appear as the description of the invention proceeds.

These objects are accomplished by extruding into an aqueous coagulating medium the elastomeric polymer dissolved in a solvent mixture comprising a major proportion of a solvent for the polymer and a minor proportion of an additive or plasticizer which swells the polymer and is substantially insoluble in the said aqueous coagulating medium.

The solution of elastomeric polymer can be prepared by direct polymerization in the solvent mixture or alternatively, in some cases, by dissolving the polymer in the solvent mixture. Dissolving the elastomer in the solvent, where this is possible, is preferably carried out by preparing a solution of elastomer in solvent and subsequently adding the additive to the solution, slowly and with stirring. This mode of procedure is used because the polymer does not always dissolve in the solvent mixture in a reasonable length of time. Occasionally the polymer is not soluble in the mixture at all but will remain in metastable solution if this solution is prepared as set forth above.

For elastomers which cannot be dissolved in the solvent even in the absence of the additive, the solution may be prepared by carrying out the final step of the polymerization in the presence of the solvent. This technique applies especially to elastomers in which the soft segment comprises a polyether, described in copending application, Ser. No. 556,071. A prepolymer is first prepared in a "capping" step, in which a polyether glycol is provided with isocyanate ends by reaction with a diisocyanate in a molar ratio of 1 to 2. In some cases the polyether glycol is first "coupled" by reaction with diisocyanate in a molar ratio of 2 to 1 or 3 to 2 in order to form "dimer" or "trimer,"

"dimer":

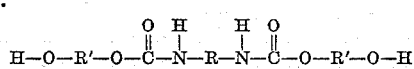

"trimer":

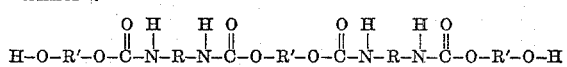

where —OR'—O represents a divalent polyether radical and —R— represents a divalent organic radical. The dimer or trimer is then capped with diisocyanate in a subsequent step. If, for example, the isocyanate used in coupling is 2,4-tolylene diisocyanate, the "coupled" prepolymer has a lower melting point than a monomeric prepolymer of the same molecular weight, and for this reason leads to superior elastomers.

The final step in the polymerization is also disclosed in copending application Ser. No. 556,071. In this step, called the "chain extension" step, the "prepolymer" of molecular weight between 700 and 5000 is reacted with an equimolar quantity of hydrazine as hydrazine hydrate according to the equation

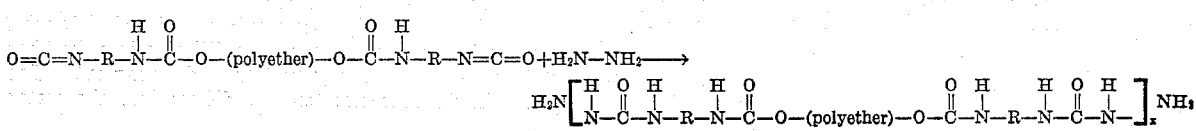

where —R— represents a divalent organic radical; —(polyether)— represents a divalent organic radical comprising a polyether; and x represents the number of segments in the extended chain. Instead of being terminated with —NH₂ groups (or —N=C=O groups), the chain may be terminated with other groups such as R₂N— or RO— if "chain stoppers" are present during the reaction. In carrying out the reaction the prepolymer is dissolved in the chosen solvent, and to the resultant solution is added a solution of the chain extension agent, hydrazine hydrate. The solvents used may be the same or different. For example, the prepolymer may be dissolved in solvent and the hydrazine may be dissolved in the additive. Or if desired, a mixture of solvent and additive may be used with both hydrazine and prepolymer. Or, of course, only the solvent may be present during the chain extension, and in this case the additive is added subsequently.

The polymers used in this invention are substantially linear, segmented elastomers. The words "substantially linear" are not intended to exclude structures having branches extending out from the polymer chain but only those which are highly cross-linked. By "segmented elastomers" is meant elastomers having segments of a high melting polymer ("hard" segments) alternating with segments of a low melting polymer ("soft" segments). In the elastomers whose preparation is discussed above, the low melting segment comprises a polyether having a molecular weight above about 700, while the high melting segment comprises at least one repeating unit of a bis-ureylene polymer having a melting point above about 250° C. in the fiber-forming molecular weight range, i.e., about 10,000. The "hard" segment, which may be represented by the formula

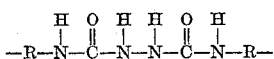

in which R is a bivalent organic radical, is chemically connected to the "soft" segment through

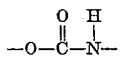

linkages. It is required that the "soft" segment have a melting point less than 50° C. and that the "hard" segment polymer have a melting point greater than 250° C.

Solutions of elastomers containing other types of soft segments, such as polyesters, and chain extension agents other than hydrazine, such as difunctional amines, are also suitable for use in the process of this invention after admixture of a suitable additive.

Suitable solvents are water-miscible compounds with 2 to 6 carbon atoms and a dipole moment greater than 3.5, which have no active hydrogen atoms but have donor oxygen atoms for hydrogen bonding. Examples are dimethyl formamide, dimethyl acetamide, dimethyl propionamide, methoxy dimethyl acetamide, hexamethyl phosphoramide, dimethyl nitrosoamine, N-methyl pyrrolidone, N-acetyl morpholine, dimethyl sulfoxide, tetramethylene sulfone, and mixtures of the foregoing compounds.

Any plasticizer for the polymers which is soluble in the polymer solvent but water-insoluble and does not have an adverse effect on the polymer or its properties and those of the fibers made therefrom but is innocuous thereto is satisfactory as an additive for the purpose of the invention. As a matter of laboratory practice, a potential additive is added to the polymer solution at a concentration of about 10%. If the two phases mix and the polymer remains in solution, the solution is cast onto a glass plate as a film .005 inch thick. The film is then extracted by dipping in a water bath. If the resultant polymer film is clear, the additive is suitable for use in the present invention. Examples of suitable compounds are m-cresol, nitrobenzene, toluene, ethyl acetate, benzyl alcohol and chlorinated hydrocarbons such as tetrachloroethylene, trichloroethylene, methylene chloride, and tetrachloroethane. Mixtures of additives also function satisfactorily.

"Insolubility" is here taken to mean solubility to the extent of less than 5% at 25° C, the stated percentage being by weight. It is preferable that the concentration of polymer in solution be between 5% and 30%, although solutions of less than 5% can be spun, and the only limiting factor on the upper level of the concentration is the stability of the polymer solution. The solvent mixture should contain a concentration of additive between 10% and 50%. The beneficial effect of the additive is usually evident at the lower end of this range of concentration, and this is preferred because of the greater solution stability at low additive concentrations.

Figure 2:
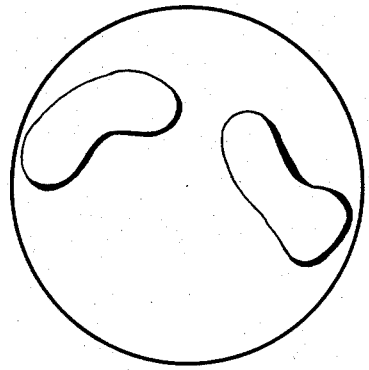
Figure 3:
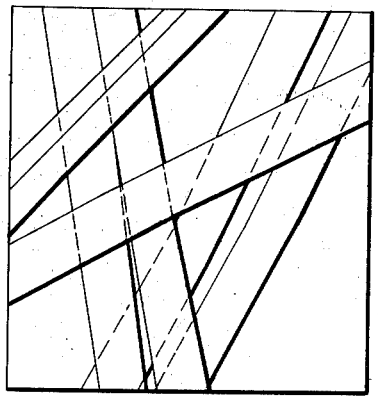
Figure 4:
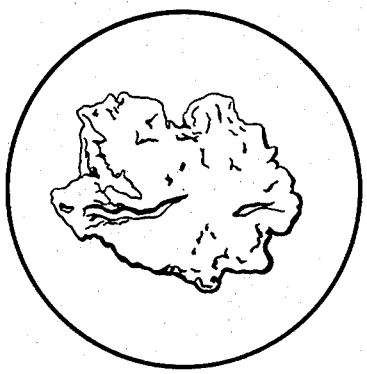
Figure 5:
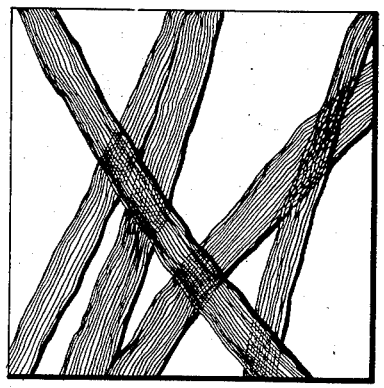

The invention will be better understood by referring to the accompanying drawing, which is presented for purposes of illustration only and should not be interpreted as limiting the invention in any way. Figure 1 is a diagrammatic view of suitable apparatus for carrying out the invention. Figures 2 and 3 represent a cross-section and longitudinal view of a fiber spun according to the process of this invention. Figures 4 and 5 represent a cross-section and longitudinal view of a fiber wet spun in the absence of additive, but otherwise under the same conditions as the fiber in Figures 2 and 3. It will be noticed that while the fiber of Figures 2 and 3 is smooth and transparent, the fiber of Figures 4 and 5 is crenulated and pocked with voids which lead to its chalky appearance and relatively poor physical properties.

In Figure 1 polymer solution is delivered through gooseneck 1 to spinneret 2, from which it is extruded into coagulating bath 3; the extruded solution is converted to a gel yarn by loss of solvent to the bath. The yarn 9 then passes several times over canted rolls 4, which serve to increase the length of travel in the bath, and is removed from the bath and wound up on bobbin 5. The yarn on bobbin 5 is washed by hot-water spray 6. The liquid in the coagulation bath is kept at the desired concentration by being continuously renewed through nozzle 7 and removed through drain 8.

The coagulation bath is generally water, or a mixture of water and solvent, but other solvent-miscible liquids are feasible. In cases in which a low boiling modifier, such as methylene chloride is used, the temperature of the coagulation bath should be less than the boiling point of this additive in order to avoid vaporization of the additive inside the fiber with consequent weakening of the structure by formation of large voids. The optimum bath temperature will, of course, depend upon the nature and concentration of polymer and additive, the nature of the solvent being used, and upon the concentration of solvent in the coagulation bath.

During the spinning process the threadline is stretched only to the extent made necessary by viscous drag. The length of travel of the threadline in the bath will depend upon the denier, the rate of extrusion, and rate of wind-up, the temperature of the coagulation bath, the nature of the solvent, and the concentration of the polymer dope. The extraction of solvent must be sufficiently complete to give a non-sticky yarn at the time the filament emerges from the coagulation bath. In order to facilitate removal from the wind-up roll, talc or similar non-stick agent may be applied to the yarn at a point between its emergence from the bath and the wind-up, but such treatment is not essential.

One function of the additive is to reduce the rate of coagulation of the filament. Additive remaining in the fiber during and after solvent extraction slows skin formation and allows the cross-section to collapse in a uniform manner without development of voids.

Another function of the additive is its prevention of the back-diffusion of water into the nascent fiber. The presence in the spin dope of a substance immiscible with water tends to prevent water from diffusing into the fiber but does not prevent the solvent from diffusing out. The additive itself does not tend to diffuse into the water owing to its immiscibility, and since it is so chosen that it does not precipitate the polymer, the solvent can be entirely removed, leaving a gel fiber somewhat swollen by residual additive. The water in the coagulating bath will have its greatest tendency to penetrate the nascent fiber just as it emerges from the spinneret, because at this point the additive concentration in the fiber is least and presents the smallest barrier. At subsequent stages the concentration of additive becomes progressively greater, and accordingly the opportunity for penetration by water becomes less. This water-excluding function of the additive is important in preventing the formation of gas bubbles by reaction of the water with substances within the nascent fiber, for example according to the equation $$R-NCO + H_2O \rightarrow R-NH_2 + CO_2$$

The presence of isocyanate is to be expected from the decomposition of dimeric diisocyanate and possibly by decomposition of isocyanate addition compounds.

In order to perform its function properly at relatively low concentration, the additive must tend to remain with the nascent fiber, that is, it must resist being swept out into the bath by the departing solvent. For this reason additives having a high boiling point are preferred. A high affinity between the additive and the polymer is also characteristic of preferred additives. Nevertheless, even with the best additives, by the time the fiber has traversed the entire distance of the bath, there may remain in it very little or none of the additive. The additive removed from the fiber collects as a separate phase or, especially in hot baths, departs as a vapor.

Various substances can be present in the spinning solution in order to decrease formation of gel particles, enhance polymer stability, retard color formation, alter the viscosity of the solution, or influence the physical or chemical properties of the final product in various ways. Examples of such substances are hydrazine hydrate, sodium bisulfite, titanium dioxide, barium sulfate, antimony trioxide, sulfur, paraffin, polyacrylonitrile microgels, antioxidants, whitening agents, pigments and fibrous or plate-like materials.

Substances which may be present in the setting bath include organic and inorganic salts, thickeners, substances inhibiting chemical change in solvent or additive, and substances altering the mutual solubility of solvent, additive and water or other bath liquid.

The following examples are given to illustrate but not limit the invention. The elastomer used in the examples may be substituted by any elastomer falling within the terms of the claims or within those disclosed in Ser. No. 556,071. The reaction time and temperature as well as the spinning conditions may also vary as indicated above. Likewise, the amount of additive may be varied within the limits disclosed and the additive given may be substituted by a like amount with any one of the substituted hydrocarbons disclosed above.

EXAMPLE I 2000 parts by weight of poly(tetramethylene oxide) glycol of hydroxyl number 112 (molecular weight 1000) are reacted with 174 parts of 2,4-tolylene diisocyanate (molar ratio 2/1) for 3 hours on a steam bath in an inert, dry atmosphere at 120° C., with agitation. Without removing the mixture from the steam bath 500 parts of methylene bis(4-phenyl isocyanate) are added, and the mixture is stirred for an additional hour at 80° C. The product is reacted with 50 parts of hydrazine hydrate in 8120 parts dimethyl formamide. The polymer solution has a concentration of 25%.

To the solution are added 4610 parts of tetrachloroethylene, giving a spin dope containing 17.5% polymer, 29.9% tetrachloroethylene, and 52.6% dimethyl formamide. The solution is extruded through a .020 inch orifice into a water bath maintained at 70° C. The fiber is in contact with the water bath for one minute and is wound up at 15 yards per minute. Properties of the fiber are presented in Table I.

EXAMPLE II

To 108 parts of polymer solution prepared as in Example I are added 35 parts of m-cresol. The procedure of Example I is followed in spinning fiber having the properties presented in Table I.

EXAMPLE III

To 108 parts of polymer solution prepared as in Example I are added 36 parts of nitrobenzene. The procedure of Example I is followed in spinning fiber having the properties presented in Table I.

Table I

|  | T, g.p.d. | E, percent | $\overline{M}_{50}$ | Den. |
|---|---|---|---|---|
| Control (DMF) | 0.36 | 521 | 0.05 | 332 |
| Tetrachloroethylene | 0.55 | 641 | 0.05 | 337 |
| m-Cresol | 0.68 | 600 | 0.07 | 326 |
| Nitrobenzene | 0.74 | 640 | 0.06 | 367 |

EXAMPLE IV 79.8 parts of adipic acid and 50 parts of propylene glycol (mole ratio 1/1.2) are heated at 180 to 185° C. for 24 hours with a nitrogen flush. The mixture is heated at 170° C. for an additional 24 hours at 0.1 mm. of mercury. 102 parts of product are obtained having an average molecular weight of 1710. 56.0 parts of the product dissolved in 134 parts of methylene chloride, are added to 16.4 parts of methylene bis(4-phenyl isocyanate) (molar ratio 1/2), and the mixture is heated at 95° C. for 2 hours under nitrogen. The product is cooled to room temperature and dissolved in 250 parts of dimethyl formamide. To the cool solution are added 1.64 parts of hydrazine hydrate (molar ratio hydrazine ends to isocyanate ends=1/1) in 50 parts of dimethyl formamide. The polymer so prepared has an inherent viscosity of 0.74. The 20% solution is wet spun in the conventional manner into a water bath at 80° C. Properties are given in Table II.

EXAMPLE V

To 120 parts of the solution of Example IV are added 30 parts of tetrachloroethylene. This solution is spun into a water bath at 80° C. Properties are given in Table II.

Table II

|  | T | E, percent | $\overline{M}_{50}$ (g.p.d.) |
|---|---|---|---|
| Example IV (no additive) | 0.27 | 838 | 0.05 |
| Example V (additive) | 0.37 | 820 | 0.05 |

"$\overline{M}_{50}$" is stress/strain at 50% elongation. Inherent viscosity is measured at a concentration of 0.5% in hexamethyl phosphoramide.

Fibers, filaments, yarns, cords, films, ribbons, tapes, and other shaped articles may be prepared by the process of this invention. The fibrous product may be used, either alone or in blends with natural or synthetic fibers, in the preparation of woven and non-woven fabrics, felts, batts, papers, and laminated structures, especially for use in the fabrication of foundation garments, bathing suits, and athletic gear. The invention can also be used in the coating of fibers, films, or fabrics and in the preparation of novel articles such as sheath-core or side-by-side dual fibers.

It will be apparent that many widely different embodiments of this invention may be made without departing from the spirit and scope thereof, and therefore

I claim:

1. In the process of wet spinning elastomeric polymers in which the said polymer is dissolved in a solvent mixture and thereafter extruded through a spinneret into an aqueous coagulating medium, the improvement which comprises adding to the solvent mixture a water-insoluble plasticizer for the polymer and after extruding said mixture through said spinneret substantially removing said plasticizer from said polymer.

2. The process of claim 1 in which the elastomeric polymer is prepared by polymerizing in a solvent mixture.

3. The process of claim 1 in which the elastomeric polymer is obtained by first reacting a polyether glycol with a diisocyanate to obtain an intermediate having a molecular weight between 700 and 5,000 and thereafter reacting the said intermediate with hydrazine.

4. The process of claim 1 in which the polymer is a segmented elastomer having alternating segments melting less than 50° C. and melting higher than 250° C.

5. The process of claim 1 in which the plasticizer is a chlorinated hydrocarbon.

6. The process of claim 5 in which the plasticizer is tetrachloroethylene.

7. The process of claim 1 in which the solvent for the elastomeric polymer is a water-miscible compound having from 2 to 6 carbon atoms and a dipole moment greater than 3.5 and which has no active hydrogen atoms but has donor oxygen atoms for hydrogen bonding.

8. The process of claim 7 in which the solvent is dimethyl formamide.

9. The process of claim 1 in which the polymer is present in an amount between about 5% and 30% by weight before spinning.

10. The process of claim 1 in which the concentration of the plasticizer in the solvent mixture is between about 10% and 50% by weight.

11. In a process of wet spinning a segmented elastomeric polymer prepared by the chain extension of isocyanate-terminated macromolecules selected from the group consisting of isocyanate-terminated polyethers and polyesters having a molecular weight above about 700 which includes dissolving said polymer in a solvent therefor and extruding the solvent mixture formed thereby through a spinneret into an aqueous coagulating medium, the improvement which comprises adding to said solvent mixture a water-insoluble plasticizer for said polymer selected from the group consisting of m-cresol, nitrobenzene, toluene, ethyl acetate, benzyl alcohol, chlorinated hydrocarbons, and mixtures thereof, said water-insoluble plasticizer being present in an amount between about 10% and 50% by weight of said mixture, and substantially removing said plasticizer from said polymer while passing it through said aqueous coagulating medium.

References Cited in the file of this patent

UNITED STATES PATENTS

| | | |
|---|---|---|
| 1,951,994 | Rochet | Mar. 20, 1934 |
| 2,035,939 | Belloc | Mar. 31, 1936 |
| 2,190,265 | Hubert | Feb. 13, 1940 |
| 2,755,266 | Brenschede | July 17, 1956 |
| 2,814,606 | Stilmar | Nov. 26, 1957 |